United States Patent [19]

Sherman

[11] 4,286,194
[45] Aug. 25, 1981

[54] GENERATOR FOR USE WITH LOADS HAVING CHANGING IMPEDANCE CHARACTERISTICS

[76] Inventor: Eli H. Sherman, 12554 Havelock Ave., Los Angeles, Calif. 90066

[21] Appl. No.: 45,111

[22] Filed: Jun. 7, 1979

Related U.S. Application Data

[63] Continuation-in-part of Ser. No. 961,976, Nov. 20, 1978, abandoned, which is a continuation of Ser. No. 857,220, Dec. 5, 1977, Pat. No. 4,129,805.

[51] Int. Cl.³ .............................................. H05B 41/29
[52] U.S. Cl. ................................. 315/209 R; 315/187; 315/191; 315/221; 315/228; 315/DIG. 7
[58] Field of Search ................... 315/209 R, 219, 224, 315/DIG. 7, 186, 187, 191, 228, 232, 211; 331/112

[56] References Cited

U.S. PATENT DOCUMENTS

| | | | |
|---|---|---|---|
| 3,505,562 | 4/1970 | Engel | 315/DIG. 7 |
| 3,573,544 | 4/1971 | Zonis et al. | 315/219 X |
| 3,579,026 | 5/1971 | Paget | 315/DIG. 7 |
| 3,889,153 | 6/1975 | Pierce | 315/209 R |

FOREIGN PATENT DOCUMENTS

| | | | |
|---|---|---|---|
| 2610944 | 9/1977 | Fed. Rep. of Germany | 315/219 |
| 2379967 | 10/1978 | France | 315/DIG. 7 |
| 774474 | 5/1957 | United Kingdom | 315/DIG. 7 |

*Primary Examiner*—Eugene R. LaRoche
*Attorney, Agent, or Firm*—Robert J. Schaap

[57] ABSTRACT

A generator for the starting and thereafter maintaining energization and operation of a load which has a relatively high impedance during starting and a substantially lower impedance after starting and during operation thereof. The load may be an ionic conduction lamp including a phosphor excitable lamp in the nature of a fluorescent lamp, or electroluminescent lamp, or vapor lamp. The generator includes a mechanism for generating electrical power with a relatively high voltage and impedance so as to match the relatively high impedance of the load before starting and generization of electrical power of a substantially lower voltage and impedance so as to match the lower impedance of the load during the energizing and operation of the load. The mechanism for generating the electrical power may be an inductive member, such as a coil, and a solid state element, such as a transistor, to develop a voltage over the coil. The coil may be coupled to the lamp through some agent developing a capacitance, e.g., a conductor with a capacitor or stray capacitance between the lamp and the coil. Further a tap intermediate the ends of the coil may be coupled to the load. The capacitance which couples the generator to the lamp before starting is effectively electrically inoperable and out of the circuit after starting of the load. The agent developing the capacitance is located such that the full voltage developed across the coil is delivered to the load during starting, but after starting and during operation only a portion of the voltage developed between one terminal and the tap of the coil is used to drive the load. The generator thereby eliminates the need of a conventional ballast and starting mechanism. In this way, energization of the lamp can be maintained with substantial energy savings compared to prior art ballasts used with ionic conduction lamps. Further energy savings are achieved by generating current and voltage pulses for operating the lamp where the voltage pulses have a greater decay rate to a zero level than the current pulses which have a more gradual decay. Thus, the lamps may be driven by an electric signal where the current pulses are driven by a substantially reduced voltage level for a substantial period of time.

68 Claims, 25 Drawing Figures

GENERATOR FOR USE WITH LOADS HAVING CHANGING IMPEDANCE CHARACTERISTICS

RELATED APPLICATIONS

This application is a continuation-in-part of U.S. patent application Ser. No. 961,976, filed Nov. 20, 1978, for "Impulse Generator for use with Phosphor Energizable Lamps", which is, in turn, a continuation of U.S. patent application Ser. No. 857,220, filed Dec. 5, 1977, for "Impulse Generator for use with Phosphor Energizable Lamps", (now U.S. Pat. No. 4,129,805, dated Dec. 12, 1978).

BACKGROUND OF THE INVENTION

1. Purpose of the Invention

This invention relates to certain new and useful improvements in generators for use with loads having changing impedance characteristics and method of use therefor, and, more particularly, to generators which have power outputs with impedance to match the impedance characteristics of the loads and which loads which may be in the form of ionic conduction lamps.

2. Brief Description of the Prior Art

For many years, ionic conduction lamps, including phosphor excitable lamps, have been used, and have replaced the conventional incandescent lamps in many applications. Phosphor excitable lamps include, for example, the well-known fluorescent lamp and similar gaseous discharge lamps, and the more recent electroluminescent lamp, sometimes referred to as a "cathode discharge lamps".

Phosphor excitable lamps operate on the principle of generating ultraviolet radiation by charging a gas, such as mercury, with electrons, and energizing or exciting the phosphors included in a phosphor coating in the lamp to produce visible light. In most conventional fluorescent lamps and similar gas discharge lamps, the lamp includes a hot cathode located on the interior thereof and connected to electrodes on the exterior of the lamp. In the electroluminescent lamp, a capacitive effect is achieved with a phosphor coating on a transparent sheet and with a second electrode being comprised of an aluminum or similar metal sheet. Other forms of ionic conduction lamps include for example, the metal vapor lamps e.g., the sodium vapor lamps and the mercury vapor lamps. These lamps also operate on the basis of generating an ionic current flow, much in the same manner as the phosphor excitable lamps.

These ionic conduction lamps are operable in conjunction with any of a number of conventionally known ballasts. The ballast is generally a series reactor transformer which includes a large number of windings. Thus, the ballast acts as an inductive device to increase the voltage for igniting the ionic conduction lamp. The ballast primarily serves to both ignite the lamp and to also limit the current to the lamp. Immediately after the lamp is ignited, the impedance of the lamp drops to a very low level and, hence, it is necessary to limit the current after ignition in order to avoid burning-up the lamp. The inductive reactance in the conventional ballast operates to limit the current after ignition of the lamp.

There are many disadvantages of the conventional ballast system used in connection with ionic conduction lamps. One of the disadvantages lies in the weight and size factor of the conventional ballast. Due to the heavy transformer, provision must be made in each conventional lamp fixture in order to mount and support the weight of the ballast. Moreover, if they are used for any excessive period of time, the ballast may heat up and may tend to burn out thereby necessitating replacement.

In addition to the above, these conventional ballasts utilize low frequency operation, as for example, 60 Hz power. Moreover, by virtue of the construction of the conventional ballasts, they are typically not adaptable for high-frequency operation. The transformer core in the ballast often tends to vibrate and generate a hum in the audible frequency spectrum. While this hum may not have a great amplitude, it is, nevertheless, distracting and uncomfortable.

Another disadvantage of the conventional ballast is that large capacitors are oftentimes required to correct the power factor and phase displacement. These capacitors are relatively expensive due to their size and thus substantially increase the overall cost of the ballast. Even moreso, the use of an inductive device of this type often generates a significant amount of heat. In many cases, where the lamp is not mounted in an environment where air flow can dissipate the heat, other means must be employed to dissipate the heat generated by the ballast.

One of the significant disadvantages of conventional ballasts, at least in present energy shortage times, is that the ballast requires a substantial amount of electrical power for its operation in order to ignite and thereafter maintain energization of the lamp. A substantial amount of power is required to ignite the ionic conduction lamp and after the lamp has been ignited, a lesser but continuing current source is applied to the two electrodes of the lamp in order to maintain energization thereof.

There have been several proposed high frequency operating devices which employ both an inductor and a transistor for purposes of operating fluorescent lamps. For example, U.S. Pat. No. 3,396,307 to Campbell discloses an inverter circuit operating a fluorescent lamp from a direct current source. A shunt capacitor is also used and is connected across a secondary coil of a transformer for load regulation when excessively high voltage conditions might be incurred. U.S. Pat. No. 3,889,153 to Pierce also discloses a power source for operating fluorescent lamps and similar lamps at a frequency of 20,000 hertz. In addition, U.S. Pat. No. 4,005,335 to Perper discloses another form of power source similarly provided for operating fluorescent lamps at a frequency of 20,000 hertz.

It has been found by use of the generator of the present invention, that it is possible to maintain energization of the lamp and obtain the same light output as a lamp operated with a conventional ballast, but with lesser power consumption; or otherwise to obtain a greater light output as a lamp operated with a conventional ballast with only the same power consumption.

OBJECTS OF THE INVENTION

It is, therefore, a primary object of the present invention to provide a generator capable of being used with loads having a relatively high starting impedance and a substantially lower operating impedance and which generator is capable of providing a first power output having an impedance to match the relatively high impedance of the load during starting and a second power output to match the impedance of the load after starting and during the operation thereof.

It is another object of the present invention to provide a generator of the type stated which utilizes a circuit capable of generating a voltage across an inductor and where a substantial portion of the voltage across the inductor is used for starting of a load having a relatively high starting impedance and a lower operating impedance and which generator thereafter permits a lesser voltage generated across such inductor to be used for operating the load after the starting thereof.

It is a further object of the present invention to provide a generator of the type stated which utilizes a tap intermediate the ends thereof and which is operable by a capacitive means such that the capacitive means is operable in the circuit during the starting of the load when a high power output is required and which capacitive means immediately becomes effectively inoperable in the circuit after the impedance of the load changes and thereby permits a lower power usuage for operation of the load.

It is an additional object of the present invention to provide a generator of the type stated which is capable of being used with ionic conduction lamps such that a substantial amount of voltage is applied across the lamp during the starting thereof and a much lower amount of voltage is applied after the lamp has started when its impedance has dropped substantially.

It is also an object of the present invention to provide a generator of the type stated which is relatively inexpensive to manufacture and which utilizes an effective electrical switch means to shift from high impedance to low impedance in response to the change of impedance in the load requirements.

It is another salient object of the present invention to provide a method of operating a load having a high starting impedance and a lower operating impedance from a source which is capable of providing a relatively high power and a relatively high impedance to match the impedance of the load during starting and a substantially lower power with a substantially lower impedance to match the impedance of a load during operation thereof.

It is still another object of the present invention to provide a method for controlling the power applied to an ionic conduction lamp by a generator such that power is delivered to the lamp in proportion to the impedance of the lamp and which thereby permits substantial energy savings.

It is yet another object of the present invention to provide a generator of the type stated in which an electric signal used to drive an ionic conduction lamp after ignition includes current pulses which have a more gradual decay to a zero level than the corresponding voltage pulses, such that the lamp may be powered by current pulses driven by a substantially reduced voltage level.

It is still a further object of the present invention to provide a method of powering an ionic conduction lamp after ignition of same which includes applying to the lamp an electric signal with current pulses having a more gradual decay to a zero level than corresponding voltage pulses such that the lamp is powered by current pulses driven by a substantially reduced voltage level.

It is yet another salient object of the present invention to provide a generator of the type stated in which a current signal is used to drive an ionic conduction lamp after ignition of the same and which current pulses have a sharp rise time and a gradual fall time and where the fall time is the substantial portion of the pulse width of each current pulse.

With the above and other objects in view, my invention resides in the novel features of form, construction, arrangement and combination of points presently described and pointed out in the claims.

BRIEF SUMMARY OF THE DISCLOSURE

The invention relates to a generator for starting and maintaining operation of a load which has a relatively high impedance prior to starting and during the starting thereof and a substantially lower impedance after starting and during operation of the load. In this case, operation of the load is deemed to be an energizable operation, by means of application of electrical power to the load. One typical load which is operable by the generator of the present invention and for which the generator is highly effective is an ionic conduction lamp of the type mentioned above and also described in more detail hereinafter.

The ionic conduction lamp generally operates on the principle of generating ions from atoms which are typically metal atoms and form a current flow across the lamp comprised of the ions. These ions may be generated in several ways, as for example in the phosphor excitable lamps which include the gaseous discharge lamps, such as the fluorescent lamps, and the electroluminescent lamps, etc. Again, the ionic conduction lamps also include for example the metal vapor lamps, e.g., the sodium vapor and the mercury vapor lamps inasmuch as these lamps also operate on the basis of using a current flow which is at least in part comprised of ions. In the same respect it should be understood that the generator of the present invention could be used with essentially all forms of lamps, including the lamp, although it is much more effective with the ionic conduction lamps.

The generator includes a means for generating electrical power of a relatively high impedance, generally comparable to the impedance of the load, during starting, and power of a substantially lower impedance, generally comparable to the impedance of the load, after the same has started and is operating. In addition, a capacitance operable means is operatively connected to the means for generating electrical power and is operatively connectable to the load. This capacitance operable means enables delivery of the electrical power of the relatively high impedance during the starting of the load. Further, the capacitance operable means is responsive to the change of the impedance of the load and causes the electrical power of lower impedance, generally comparable to the impedance of the load during operation, to be delivered to the load after the same has started and is operating.

The capacitance operable means may be in the form of a capacitor which is directly wired from the means for generating electrical power to the load itself, as for example, an ionic conduction lamp. It is not necessary to use a hard wired capacitor as such, and the lamp could be located relative to the means for generating electrical power such that a stray capacitance can be used to couple the lamp to the means for generating electrical power. Further, it should be understood that an inductor or a resistor could be used in place of the capacitor since these elements also permit a desired voltage across the lamp. Consequently, the term capacitance operable means is deemed to include electrical elements, such as an inductor or resistor, which could exhibit effects of a capacitor, e.g., to present a relatively high impedance during operation of the load so that it is effective out of the circuit during operation of the load.

In one of the preferred embodiments of the invention, the means for generating electrical power includes an inductive member as for example, a coil of a transformer. Further, a solid state electronic element, such as a transistor, and preferably an NPN transistor, is connected to the coil in order to generate a voltage across the coil. The coil has first and second end terminals with the transistor being connected to one of the end terminals. Further, a tap means, as for example, a tap constituting a third terminal is connected to the coil intermediate the end terminals thereof. This tap is also electrically connected to the lamp for energization of the same. In accordance with this construction, the lamp is ignited through a voltage delivered through the aforesaid capacitance operable means. In essence, this voltage is substantially the entire voltage generated across the inductive member. Thereafter, the capacitance operable means has a reactance sufficiently high so that it becomes effectively inoperable in the circuit and is essentially out of the circuit. In this way, the voltage to drive the lamp after starting is delivered from that portion of the coil from one end terminal thereof to the intermediate tap. In accordance with this construction, a high voltage is delivered from the entire portion of the coil in order to start the lamp and thereafter, a low voltage is delivered to the lamp from a smaller portion of the coil.

The lamp is typically ignited by a high frequency voltage which is capable of causing the ignition of the lamp at a lower voltage than would otherwise be required.

The term "high voltage" and the term "low voltage" as used herein is used in a relative sense with respect to the load having impedance changing characteristics during starting and during operation. In other words, the term "high voltage" is used to designate that higher voltage necessary to start the load, such as the lamp, and the term "low voltage" is considered to be that voltage necessary to maintain the operation of the load, such as the lamp, during operation and after starting.

The present invention also includes a unique method for starting a load, such, as for example, an ionic conduction lamp, which has a relatively high starting impedance and a substantially lower operating impedance and which method thereafter maintains operation of the lamp or other load. In this case, the method comprises the generating and applying to the lamp a high voltage from a high source impedance in order to match the impedance of the lamp during starting and before operation of the lamp, and which lamp immediately changes from the high impedance to a low impedance after starting and during operation. Further, the method comprises automatically generating and applying to the lamp a lower voltage from a lower source impedance to match the lower impedance of the lamp during operation and after starting of the lamp, In addition, the effective application of the higher voltage immediately stops with the application of the lower voltage. The method effectively comprises the detection of the change of impedance of the lamp after starting and thereafter applying the low voltage in response to the change of impedance of the lamp.

The means for generating electrical power included the inductive member, such as the coil and the transistor, as aforesaid. A resistive-capacitive feedback circuit is also connected to the transistor and the coil and serves as a pulse control mechanism. The electrical power which is actually delivered to the lamp or other load is comprised of at least a series of current pulses. The pulses may adopt several forms as hereinafter described. Further, the inductive member may be a primary coil of a type of autotransformer and is connected to the collector of the transistor so that it is often referred to as a collector coil. The emitter of the transistor is connected to another primary coil which is, in turn, part of the resistive-capacitive feedback circuit and hence, this additional primary coil is often referred to as a feedback coil. The lamp may also be provided with heater coils which may be electromagnetically coupled to the primary coil. The heater coils and the additional primary coil along with the collector coil may be wound in a manner to form part of a coil transformer.

The core transformer may comprise a central core with the primary and heater coils, and perhaps the feedback coil, being wound upon the central core. A pair of housing sections is disposed over the core and the coils to substantially enclose the core and the coils. The housing sections are spaced apart from each other by a gap. The size of the gap is determined in order to maintain the life of the transistor. In another embodiment of the invention, the transformer, which operates as a type of autotransformer, is constructed so that the outer housing is eliminated. In this case, the coils are wound on an electrically nonconductive tubular spool with a ferromagnetic core disposed within the spool.

After the lamp or other load has been energized and is operating, the generator of the present invention also operates to supply electrical power to the load in a form where the lamp or other load can be operated with reduced power requirements. In this case, the generator includes the means for receiving the electrical power from a source thereof, as for example, conventional 110 Volt sixty cycle power. Means is operatively connected to the means receiving electrical power for generating an electrical signal with voltage pulses having peaks and a certain decay rate to a zero level and current pulses having peaks and a certain decay rate to a zero level. The decay rate of the current pulses is more gradual than the decay rate of the voltage pulses for a substantial portion of the pulse width, and typically the center pulse width for the current pulses and corresponding voltage pulses. In this way, the generator is coupled to an ionic conduction lamp such that the lamp can be powered by current pulses driven by a substantially reduced voltage level for a substantial period of time.

The current pulses have a fast rise time and a relatively slow and gradual fall time, and where the fall time constitutes a substantial portion of the pulse width of each of said current pulses. The current pulses are generated at a sequence and rate sufficient to maintain operation of said lamp. Thus, the lamp is powered by current pulses of low amplitude for a substantial portion of the time of operation. In a more preferred aspect, the amplitude of the current initially drops off rapidly after the rise and then progressively drops off more gradually, in each of said current pulses.

This invention possesses many other advantages and has other purposes which may be made more clearly apparent from the consideration of forms in which it may be embodied. These forms are shown in the drawings accompanying and forming part of the present specification. They will now be described in detail for the purpose of illustrating the general principles of the invention, but it is to be understood that such detailed descriptions are not to be taken in a limiting sense.

BRIEF DESCRIPTION OF THE DRAWINGS

Figure 1:
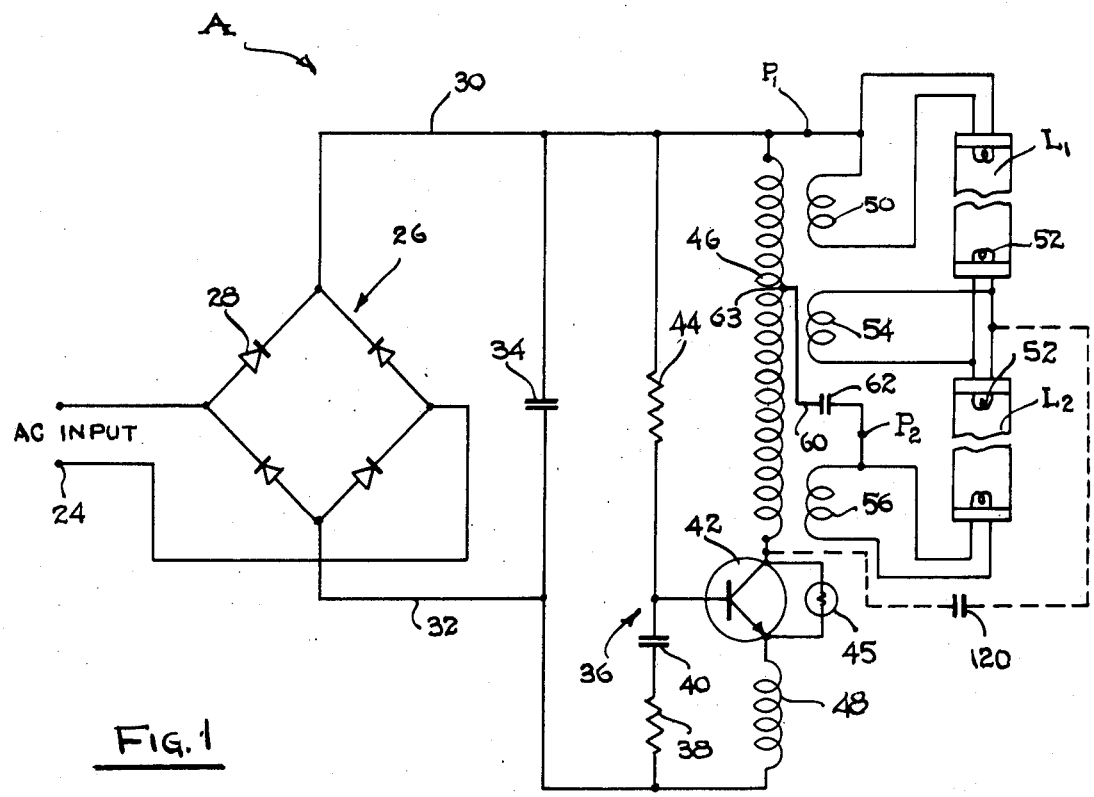
Figure 2:
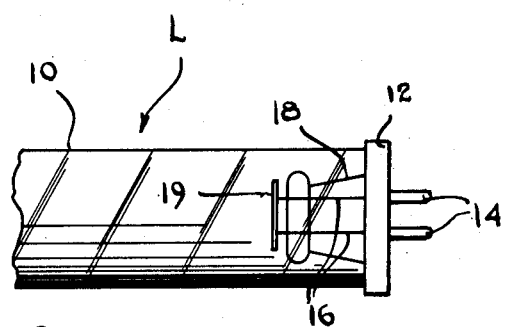
Figure 3:
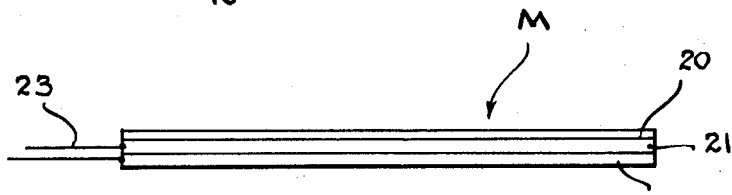
Figure 7:
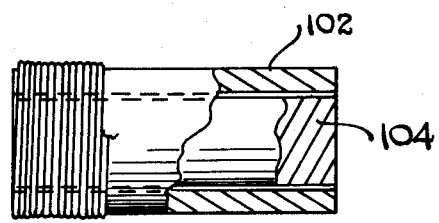
Figure 9:
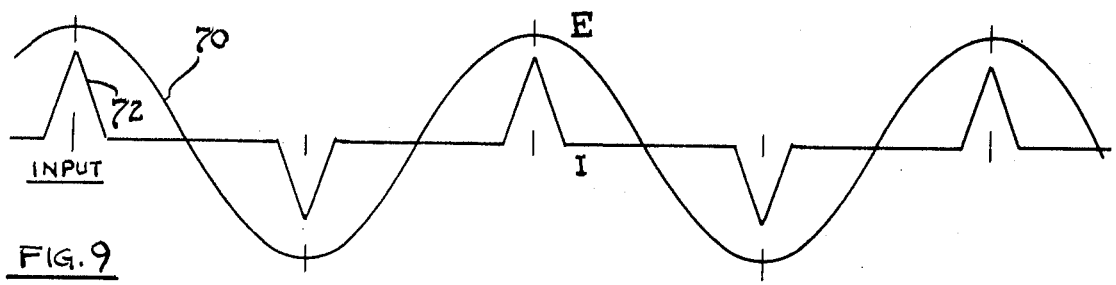
Figure 4:
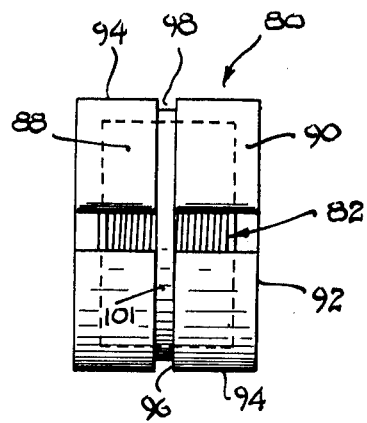
Figure 5:
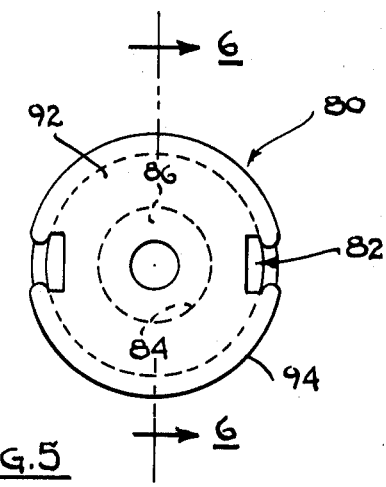
Figure 6:
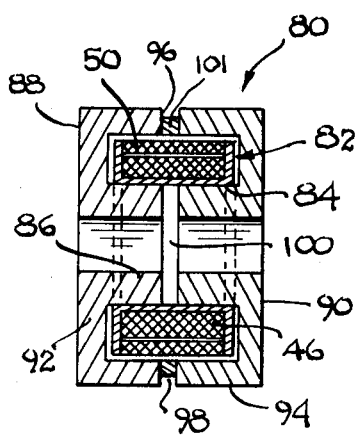
Figure 8:
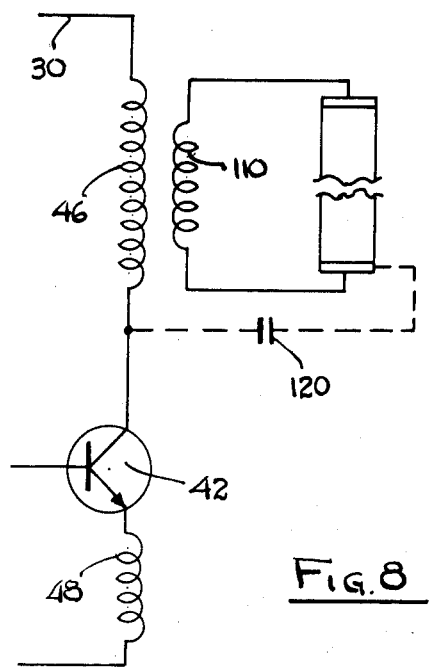
Figure 10:
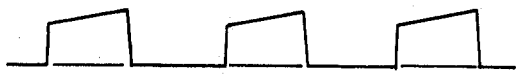
Figure 11:
Figure 12:
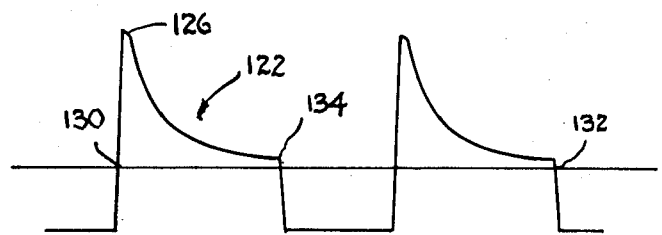
Figure 13:
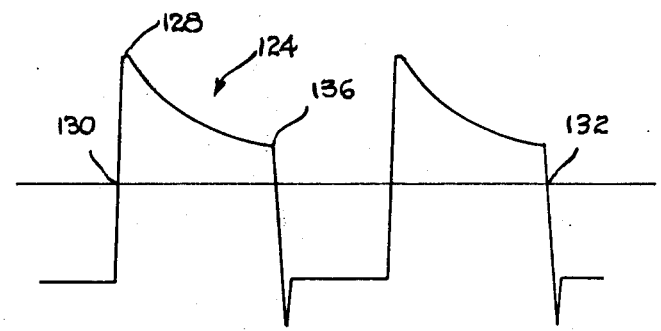
Figure 14:
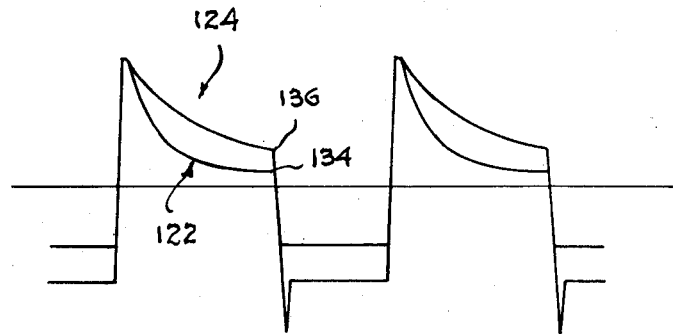
Figure 15:
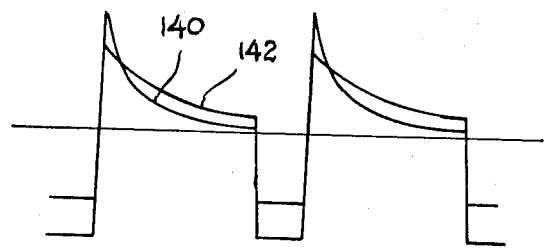
Figure 16:
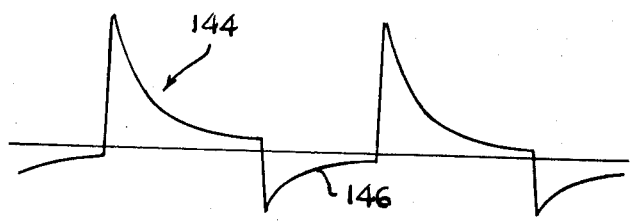
Figure 17:
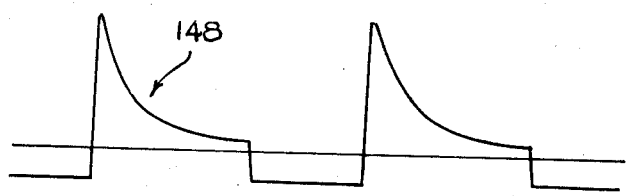
Figure 18:
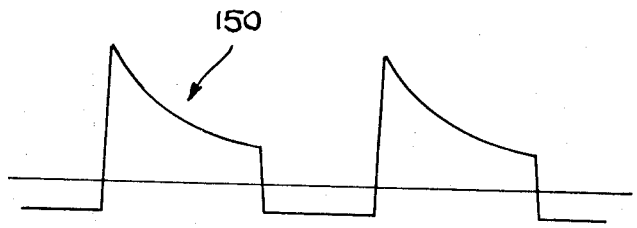
Figure 19:
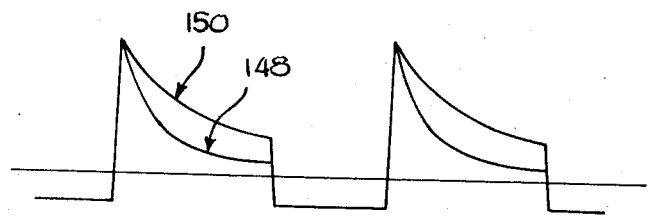
Figure 20:
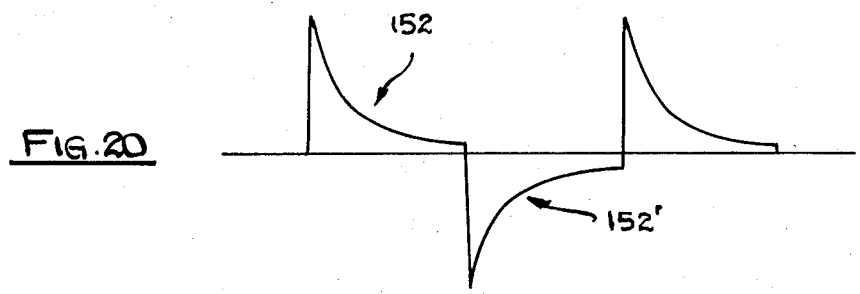
Figure 21:
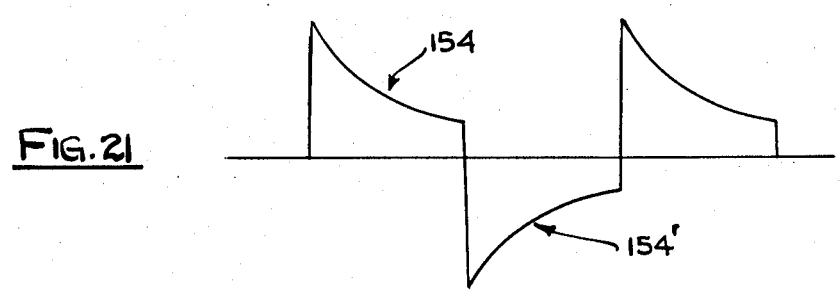
Figure 22:
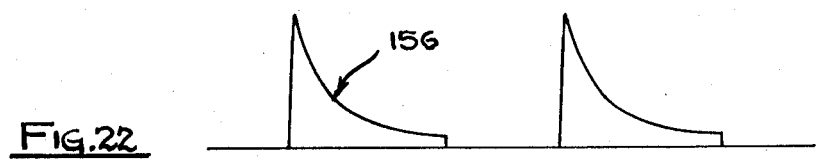
Figure 23:
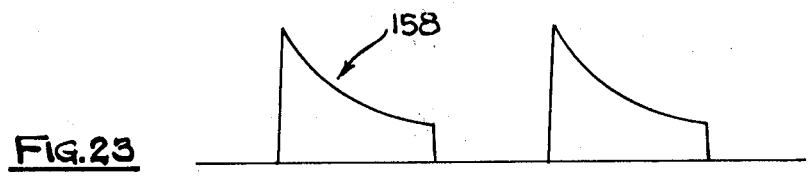
Figure 24:
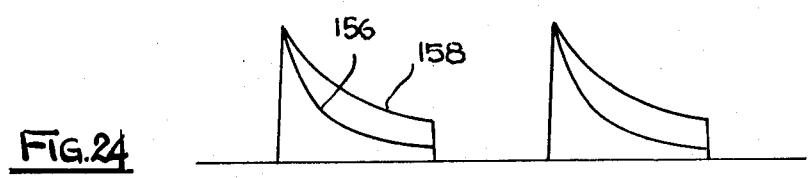
Figure 25:
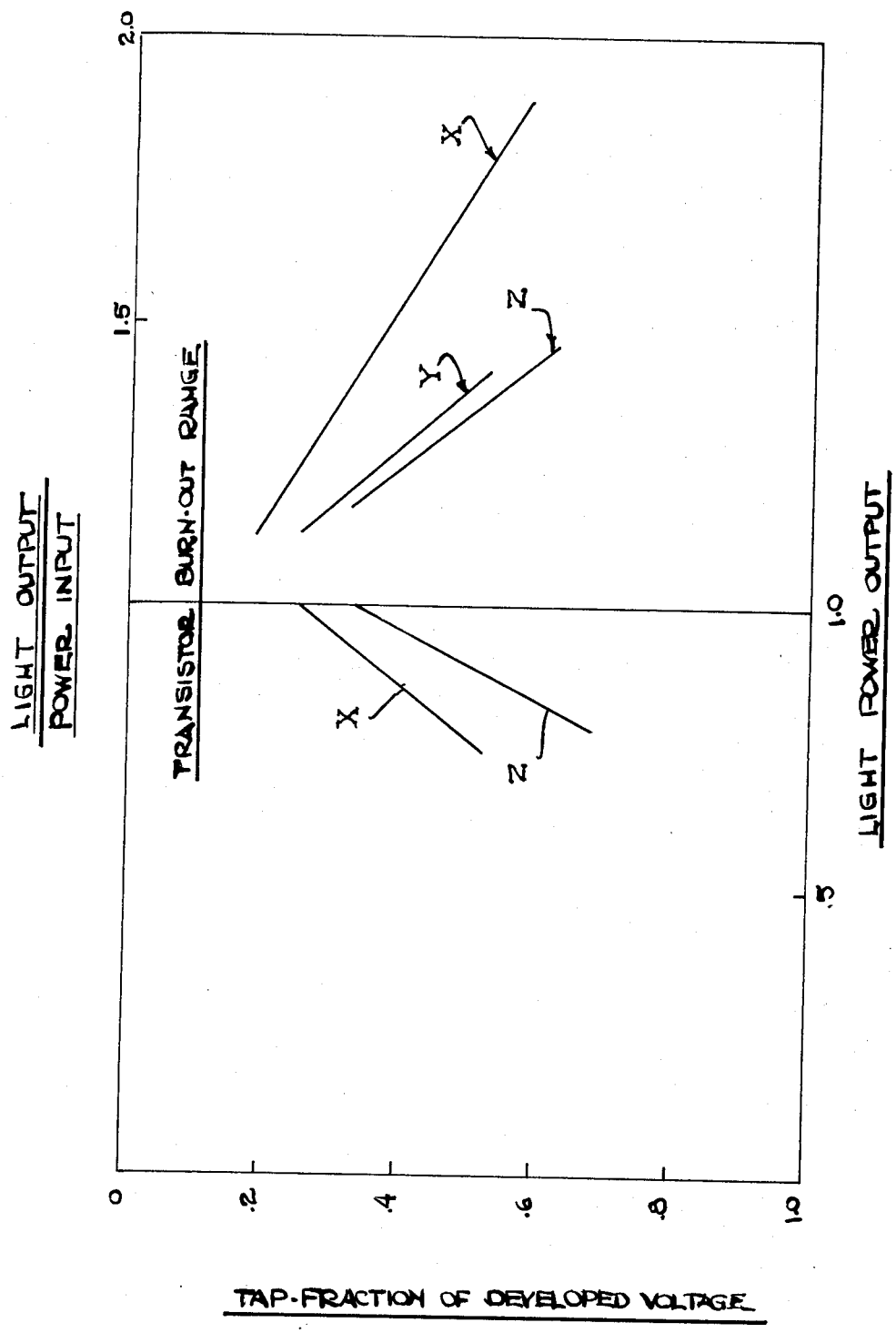

Having thus described my invention in general terms, reference will now be made to the accompanying drawings in which:

FIG. 1 is a schematic view of a circuit which forms part of the generator of the present invention and showing a pair of ionic conduction lamps connected thereto;

FIG. 2 is a fragmentary side elevational view, partially broken away and in section, and showing a portion of a conventional gaseous discharge lamp;

FIG. 3 is a schematic side elevational view showing a conventional electroluminescent lamp;

FIG. 4 is a side elevational view of a core transformer forming part of the generator of the present invention;

FIG. 5 is an end elevational view of the core transformer of FIG. 4;

FIG. 6 is a vertical sectional view taken along line 6—6 of FIG. 5;

FIG. 7 is a side elevational view partially in section showing a modified form of core transformer which may be used with the generator of the present invention;

FIG. 8 is a fragmentary schematic view of a modified circuit which forms part of the generator of the present invention and showing a single ionic conduction lamp connected thereto;

FIG. 9 is a schematic view of an AC power input into the generator of FIG. 1 and showing input current and voltage relationship;

FIG. 10 is a schematic view of DC current pulses which may be applied to the transistor in the generator of FIG. 1;

FIG. 11 is a schematic view of DC current pulses which may be generated by the generator of FIG. 1 and applied to the transistor thereof, which are similar to the DC current pulses of FIG. 10 but of reversed polarity;

FIG. 12 is a schematic view of circuit output voltage pulses which may be generated by the generator of FIG. 1;

FIG. 13 is a schematic view of circuit output current pulses corresponding to the voltage pulses of FIG. 12;

FIG. 14 is a schematic view of the current pulses of FIG. 13 superposed over the voltage pulses of FIG. 12;

FIG. 15 is a schematic view of a further form of circuit output current pulses superposed over a corresponding voltage waveform;

FIG. 16 is a schematic view of a slightly modified form of circuit output current pulses which may be generated by the generator of the present invention;

FIG. 17 is a schematic view of another form of circuit output voltage pulses which may be generated by the generator of the invention;

FIG. 18 is a schematic view of circuit output current pulses which may be generated with and correspond to the voltage pulses of FIG. 17;

FIG. 19 is a schematic view of the current pulses of FIG. 18 superposed over the voltage waveform of FIG. 17;

FIG. 20 is a schematic view of a further form of circuit output voltage pulses which may be generated by the generator of the present invention and which have negative polarity waveform pulses which are substantially similar to positive polarity waveform pulses;

FIG. 21 is a schematic view of output current pulses which may be generated with and correspond to the output voltage pulses of FIG. 20;

FIG. 22 is a schematic view of still a further form of output voltage pulses which may be generated by the generator of the present invention and which have no negative polarity pulses;

FIG. 23 is a schematic view of output current pulses which may be generated with and correspond to the output voltages of FIG. 22;

FIG. 24 is a schematic view of the current output pulses of FIG. 23 superposed over the output voltage pulses of FIG. 22; and FIG. 25 is a schematic view of a chart showing light power output and light output with respect to power input as a function of a fraction of the developed voltage in an inductive member of the generator of the present invention.

DETAILED DESCRIPTION OF PREFERRED EMBODIMENTS

Referring now in more detail and by reference characters to the drawings which illustrate a preferred embodiment of the present invention, A designates an electrical circuit forming part of the generator of the present invention. In this case, the generator A is shown as being connected to a pair of loads in the form of gaseous discharge lamps, designated as $L_1$ and $L_2$.

The gaseous discharge lamps are of a conventional construction, and one of such lamps $L_1$ is more fully illustrated in FIG. 2 of the drawings. The lamp comprises a bulb 10, which is shown as having a straight glass tube, although the tube could adopt other shapes, as for example, a circular shape, or the like. One end of the tube 10 is provided with a non-conductive base 12 having a plurality (two as shown) of electrical terminals 14. These terminals, which are often referred to as "base pins", are connected to lead-in wires 16 located internally within the tube, and the lead-in wires are located in a so-called "stem press" 18 constructed of a material to assure the same coefficient of expansion as the glass tube 10. The lead-in wires 16 are connected to a hot cathode 19 which is designed to ignite a gas in the tube as hereinafter described. The hot cathode is coated with an emissive material which emits electrons and is usually made of a coil, e.g., a simple coil tungsten wire. It should be understood that a pair of similar hot cathodes and related structure would be included at each end of the glass tube 10.

The inside of the bulb or tube 10 is provided with a phosphor coating which transforms ultraviolet radiation into the visible light. The color of the light often depends on the composition of the phosphor. A minute amount of mercury is also located in the bulb to furnish the mercury vapor for purposes of ignition. In addition, in inert gas, such as argon, krypton, and the like, may be used.

The coating on the hot cathode is generally formed of an emissive material such as barium, strontium, calcium oxide, or the like, and which emits electrons when heated to an operating temperature of about 950° C. After the cathode has been heated to the proper temperature, thermionic emission will occur. The emitted electrons, upon collision, will release ultraviolet radiation which is converted into visible light by the phosphors.

FIG. 3 illustrates in schematic side elevational view, a form of electroluminescent lamp M which can be used in combination with the generator of the present invention. The lamp M is comprised of a plastic plate 20 which is translucent and preferably transparent in its construction. Applied to one surface of the plate 20 is a phosphor coating 21 and disposed against the phosphor coating 21 is a metal sheet such as an aluminum sheet 22. Conductors 23 are attached to the coating 21 and the metal sheet 22. These conductors are adapted for connection to a suitable source of current through a ballast, and in the case of the present invention, would be connected to inputs of the generator.

The electroluminescent lamp M operates on essentially the same principle as the gaseous discharge lamp. However, in this case, the phosphors are not located in a tube or bulb. The electroluminescent lamp operates with a very high frequency creating a capacitive effect across the phosphor coating 21 and the metal sheet 22, with the phosphors converting the ultraviolet radiation into visible light radiation.

The various vapor lamps often referred to as metal vapor lamps, such as the sodium vapor lamp and the mercury vapor lamp, operate on known principles. As indicated previously, each of these metal vapor lamps, as well as the aforesaid phosphor excitable lamps, operate by developing ionic current flow. Inasmuch as all of these lamps operate on similar principles, insofar as the generator A of the present invention is concerned, the operation of the generator will only be described in connection with a gaseous discharge lamp.

As previously indicated, a ballast with a starting mechanism included therein, or otherwise a separate starting mechanism in combination with the ballast, is often required for maintaining the light output of the fluorescent tube or similar gaseous discharge lamp. In this case, the present invention replaces the conventional ballast and/or starting mechanism with the generator A.

The generator A generally includes an input means in the form of a pair of input terminals 24 which are capable of being connected to a suitable source of electrical current, as for example, 110 volt alternating electrical current. The terminals 24 are connected to opposite sides of a rectifying means such as a diode rectifier bridge 26 including four diodes 28, in the arrangement as illustrated in FIG. 1 of the drawings. The bridge rectifier 26 allows an input signal to be rectified into a DC signal, and this DC signal can be transmitted to the collector of a transistor, as hereinafter described.

Connected across the two conductors 30 and 32 from the diode bridge 26 is a capacitor 34 which operates as a ripple filter and is designed to filter ripples from the signal in order to provide an essentially DC pure signal.

The diode rectifier bridge 26, along with the other components of the generator, allow the generator to be used with either alternating electrical current or direct current. Moreover, the generator can be operated within a wide range of power sources and within a range of voltage and frequency levels. Thus, for example, the source of power may be from the electrical system of a mobile apparatus, such as an automobile, airplane, or the like.

A resistive-capacitive network comprised of a resistor 38 and a capacitor 40 forms part of a feedback loop 36 hereinafter described in more detail. The resistive-capacitor network is connected to the conductor 32 which serves as a B- conductor and to the base of a solid-state electronic element, such as an NPN transistor 42, in the manner as illustrated in FIG. 1 of the drawings. In like manner, the base of the transistor 42 is similarly connected to the conductor 30 through another resistor 44. The resistor 38 and the capacitor 40 also operate in combination as a current limiting device, namely, to keep the current level within a range capable of being handled by the transistor 42. Thus, the resistor 38 should have a sufficiently high resistivity in order to eliminate transients from being applied to the base of the transistor 42. It can be observed that as the voltage changes, the base drive to the transistor through the capacitor 40 would also change. The resistor 44 controls the voltage drop across the transistor 42 and permits bias on the base to start the transistor 42.

A Varistor 45, or smilar transistor protective device, may also be connected across the transistor 42, and particularly, the emitter and collector as shown, in order to protect the transistor from burn-out as a result of excess voltage problems. Other devices known in the art, as for example, a diode, or the like, could be used in place of the Varistor for protection of the transistor.

A primary coil 46 is connected across the conductor 30 and the collector to the transistor 42 and, in this case, is often referred to as a "collector transformer coil". The coil 46 is an inductive member and operates in conjunction with the transistor 42 to develop a voltage thereacross and which thereby serves as a means to generate electrical power to be applied to the one or more lamps. In like manner, an additional primary coil, often referred to as an "emitter coil" or "feedback coil" 48 is connected to the emitter of the transistor 42. This feedback coil 48 is connected to the resistive-capacitive network and forms part of the feedback loop 36, in the manner as illustrated in FIG. 1 of the drawings.

The output of the circuit for the purpose of the present invention is represented by two terminal points, as for example, the terminal point $P_1$ in the conductor 30 and the terminal point $P_2$ in the intermediate tap line, beyond the capacitor 62, as illustrated in FIG. 1 of the drawings. In essence, the output current may be measured passing the point $P_1$ and the output voltage may be measured across the terminal points $P_1$ and $P_2$. The output current and voltage waveforms as hereinafter described in more detail, are measured in this way. Thus, the load is considered that portion of the circuit including the lamps and the heating coils 50, 54 and 56. In some cases, the capacitor 62 can be eliminated as hereinafter described in more detail. In this case, the output terminal $P_2$ would still be located in the intermediate tap line as illustrated.

The coil 46 is provided with an intermediate tap 63 located in a conductor 60, the latter adapted for operative connection to the one or more lamps as illustrated in FIG. 1. The positioning of the tap 63 relative to the upper and lower terminals of the coil 48 is an important factor as hereinafter described in more detail. Furthermore, a capacitor 62 may be optionally included in the conductor 60. When using the capacitor 62, substantially all DC voltage is blocked and substantially only AC voltage is applied to the lamps.

The primary coil 46 operates in conjunction with three filament heating coils 50, 54 and 56 which are connected to the electrodes on the lamps $L_1$ and $L_2$. These last mentioned electrodes on the lamps may be connected to heating filaments 52 on the interior of the lamps. In this respect, it can be observed that any number of heating coils may be employed, depending on the number of lamps which are to be energized by the circuit. The number of lamps and the size of the lamps is, of course, limited by the circuit, and the circuit can be designed with different component values in order to accommodate larger sizes or a different number of lamps.

One of the electrodes of the lamp, as for example, the lamp $L_1$, is connected through a conductor 58 to the output terminal $P_1$ of the circuit. In the case of two lamps, one of the terminals of the lamp $L_2$ is connected to the conductor 60 common to the tap 63 on the primary coil 46 and the capacitor 62. A potential gradient may also exist between the two bulbs in this arrangement.

As indicated previously, the lamps $L_1$ and $L_2$ are coupled to the output of the circuit by the conductors 58 and 60 which deliver the primary source of power to the lamps for energizing the same. Other means for coupling the lamps to the circuit could be employed and one such alternate means is hereinafter described in more detail. The heater coils 50, 54 and 56 are relatively small with respect to the collector coil 46, and usually include only a few turns. Moreover, it can be observed that with the circuit of the present invention, it is possible to both ignite the lamps $L_1$ and $L_2$ and to provide a high frequency energy source from the same transformer coil. In the case of one lamp, it is desirable to also use a capacitor, such as the capacitor 62, in the conductor 60 in order to limit the current applied to one of the terminals of the lamp.

A positive potential is applied to the collector of the transistor since the collector coil 46 is of low resistance. The resistor 44 has a relatively high resistivity and provides a bias on the base of the transistor, thereby causing the emitter to become negative with respect to the collector. In this way, current will flow through the emitter coil and pulses are generated at a time frequency established by the resistive-capacitive network 36. The pulse amplitude will increase as the frequency increases, and the frequency increases as the voltage increases, as indicated above.

It can be observed in accordance with the above construction that the generator of the present invention operates somewhat as an oscillating circuit, although it does not oscillate on an AM or FM mode. Actually, the circuit oscillates on a pulse mode.

The device of the present invention also differs significantly from the conventional reactor transformer in the conventional ballast in that current is limited by the action of the voltage dependent frequency characteristics. This provides regulation to inhibit the in-rush of current as the lamps ignite which causes the high impedance level to drop almost toward a zero level.

The collector coil 46 and the feedback coil 48, possibly along with the heater coils 50, 54 and 56, are preferably wound in a core transformer 80 of the type illustrated in FIGS. 4-6 of the drawings. Core transformers, and particularly, ferrite core transformers, are highly desirable for use in the present invention. Particularly, the high frequency operation of the circuit enables the use of highly efficient transformer core materials. The core materials which may be used in the present invention are generally frequency dependent. Further, these materials should be selected so as to provide a narrow hysteresis loop. These materials will normally have a high permability and a high resistivity. Further materials, such as ferrite, will have low losses so that they are effective in achieving highly efficient operation. These materials are also highly effective in that they lend themselves to operation in the frequency ranges heretofore described.

The core transformer 80 generally comprises a cylindrically shaped central spool 82 upon which the coils are wound. The spool 82 is formed of an electrically non-conductive material such as a plastic material. The spool 82 has a hollow center 84 and accommodates inwardly extending tabs 86 on each of a pair of opposed housing sections 88 and 90. By reference to FIG. 5, it can be observed that the housing sections 88 and 90 are generally cylindrical in shape and have an outer end wall 92 along with a peripherally extending annular side wall 94. When in the assembled relationship, it can be observed that the inner edges 96 of each of the side walls 94 are spaced from each other to form a gap 98 and, in like manner, the inwardly extending projections 86 are spaced apart from each other in order to form a gap 100. The gap 100 has the same size as the gap 98. A spacer 101 of electrically non-conductive material, e.g., a plastic material, may also be located in the gap 100.

The housing sections are designed so that they generally enclose the magnetic lines of force in the housing configuration. One of the unique aspects of the present invention is that the typical core transformer is not designed to be used with a gap between the housing sections. However, it has been found that the overall efficiency and effectiveness of the pulse generator is materially enhanced by employing a gap between the two housing sections.

In a preferred aspect of the present invention, the distance between the two housing sections which forms the gap should be about 3/16 of a millimeter to about $\frac{1}{2}$ of a millimeter. If the gap is too small, then energy savings are decreased, and if the gap is too large, then it will have a tendency to burn-out the transistor.

When the gap between the two housing sections 88 and 90 is too small, the magnetic material forming part of the core is brought into saturation. This is possibly due to the fact that there may be both direct and alternating current in the collector coil 46 with the direct current superimposed on the alternating current. Hence, by increasing the gap to the proper dimension, the possibility of magnetic saturation is reduced. When the gap is too large, the transistor will burn-out as aforesaid. It is speculated that the transistor burn-out arises from the fact that the voltage becomes too high for the low inductance.

FIG. 7 illustrates another form of transformer which may be used with the present invention and includes a spool 102 similar to the previously described spool 82. Again, the various coils are wound on the spool 102 in the same manner as previously described. However, in this embodiment of the transformer, the housing sections 88 and 90 are eliminated, and a central core 104 formed of a magnetically conductive material, such as an iron core, is inserted in the spool. This form of transformer has also been found to be effective.

The number of turns of the feedback coil 48, and to some extent, the number of turns of the collector coil 46 is a function of the gain of the transistor 42. If the gain in the transistor is high, then the number of turns of feedback coil 48 is relatively few. In this case, the ratio of the number of turns of the feedback coil 48 to the number of turns of the collector coil 46 is relatively high. Conversely, if the gain of the transistor 42 is low, then a larger number of turns of the feedback coil 48 is employed. In this latter case, the ratio of the number of turns of the feedback coil to the number of turns of the collector coil is relatively low. The ratio of turns of the collector coil 46 to the number of turns of the feedback coil 48 should be within the range of from about 10:1 to about 2:1. The number of turns of the collector coil would normally range from about 30 to about 1500, and the number of turns of the feedback coil 48 would normally range from about 15 to about 80. The various heater coils 50 and 56 will normally have about four turns, and the heater coil 54 will normally have about six turns. The number of turns in these heater coils should not differ widely since their voltage should not exceed about 2.8 volts RMS.

FIG. 8 illustrates a modified form of the invention wherein the lamp is inductively coupled to the output of the circuit. In this case, the coil 46 acts as a true primary transformer coil and an additional coil 110 is connected across the terminals of a lamp; only one lamp being shown in this embodiment. Further, in this form of the invention, it should be understood that the primary coil 46 and the feedback coil 48, as well as the secondary coil 110, could all be wound on the same transformer core. FIG. 8 only illustrates one technique for coupling the lamp to the circuit although other coupling techniques could be employed in accordance with the present invention, and the basic circuit lends itself to the use of a single pin or bi-pin lamps.

While the full theory of operation regarding all facets of the invention and the exact means in which energy savings is achieved may not be fully known, it nevertheless has been established that substantial energy savings are achieved by the use of the generator of the present invention. Further, several of the principles involved in the savings of energy in igniting and operating lamps have been observed and understood and to the extent these principles are believed to be understood, they are set forth herein.

As indicated previously, the impedance of a phosphor energizable lamp, prior to starting, is high, and is almost infinite in view of the fact that there is no current flowing. During the starting of the lamp, while the impedance is not infinite, it is extremely high, usually in excess of many thousand ohms. However, after the lamp does ignite, the impedance drops substantially to a low impedance.

The time dependance of the voltage being introduced to the lamp in the present invention is very different than in the prior art ballasts, and the number of polar reversals is significantly different. The standard ballast operates with a 60 Hertz alternating current, and these pulses ae symmetrical. In the generator of the present invention, the invention may operate in the range of 20,000 hertz and greater with the positive pulses preferably, though not necessarily, having a much greater amplitude than the negative pulses. In several embodiments of the invention, the positive pulses may have an amplitude five or six times greater than the amplitude of the negative pulses.

The circuit of the present invention is designed to operate at high frequency, usually within the range of about 8 kilohertz to about 500 kilohertz, although a preferable range is about 10 kilohertz to about 50 kilohertz, and a more preferred range of operation is usually about 20 kilohertz to about 40 kilohertz. The most desirable operating frequency is within the range of 22 to 25 kilohertz. The high frequency operation permits the use of a highly efficient core material forming part of the autotransformer hereinafter described in more detail and of which the coils 46 and 48 are a part.

The position of intermediate tap 63 on the coil 46 must be properly chosen as aforesaid. If the tap is located too close to the upper terminal, then there is insufficient voltage to start the lamp whereas, if the tap 63 is located closer to the transistor 42, there may be more than sufficient voltage to start the lamp, but there is also too much voltage being used to drive the lamps after they have ignited. Consequently, it is desirable to locate the tap 63 at a point between the terminals as previously described in order to obtain the optimum efficiency and yet still enable starting.

It has been found in connection with the present invention that the tap 63 should be located no further from the upper terminal of the coil 46, reference being made to FIG. 1, than a distance of about no greater than 40 percent of the overall length of the coil and not nearer to the upper terminal than a distance of about no less than 15 percent of the overall length of the coil 46. More preferably, the tap 63 should be located no further from the upper terminal than a distance of about no greater than 35 percent of the overall length of the coil and not nearer to the upper terminal than a distance of about no less than 20 percent of the overall length of the coil.

FIG. 25 more fully illustrates the light power output and the light output with respect to power input as a function of the intermediate tap position. The numbers on the ordinate represent a fraction of the developed voltage and, hence, a fraction of the developed voltage across the coil 46. In this case, the total developed voltage across the entire coil 46 would be 1.0 or 100 percent. Thus, the 1.0 position of the ordinate would represent the intermediate tap 63 at the lower terminal of the coil 46, reference being made to FIG. 1. In like manner, the 0 position of the ordinate would represent the intermediate tap 63 being located at the upper terminal of the coil 46.

The lines designed "X", "Y" and "Z" in FIG. 25 represent measurements made at three different input voltages, and the lines "X" and "Z" correspond to the measurements X and Z, respectively.

It can be observed that the transistor burn-out range results when the tap 63 is located within 20 percent of the upper terminal of the coil 46. The vertical line designated "standard" and located at the 1.0 position on the abscissa represents the light power output of a standard ballast. It can be observed that the light output of a lamp powered by the generator of the present invention decreases as the position of the intermediate tap 63 is moved closer to the lower terminal of the coil 46. Contrarywise, however, the light output per watt of input power increases substantially as the intermediate tap is moved closer to the lower terminal of the coil 46. Further, it can be observed that the light output per watt input power is significantly greater than with a standard prior art ballast.

The invention utilizes a capacitor 120, which is connected to the lower end of the coil 46, much in the manner as illustrated in FIG. 1, and is also connected to the cathode of at least the two lamps $L_1$ and $L_2$. This capacitor 120 is a relatively low value capacitor inasmuch as it is only needed in order to couple the lamps to the collector coil 46 for purposes of starting. In this way, it can be observed that when the lamp or lamps are first ignited, the full value of the voltage developed across the coil will be applied to he lamps. After the lamps have ignited, the reactance of the capacitor 120 is such that it effectively is removed from the circuit. In essence, the capacitor acts as a type of impedance switch which is responsive to the impedance change in the lamps $L_1$ and $L_2$. Thus, after the lamps are ignited, the impedance in the lamps substantially reduces. As this occurs, the capacitor 120 has a sufficiently high vlaue of reactance, so that it is effectively out of the circuit. Thus, the voltage then existing from the upper terminal of the coil 46, to the tap 63 is thereafter applied to the lamps $L_1$ and $L_2$. In other words, there is a high source impedance with respect to the lamp during starting and a substantially reduced source impedance with respect to the lamp during operation thereof. In this way, a significantly higher starting voltage is applied to the lamps and thereafter, a lesser voltage as developed across the coil between the upper end of the coil 46 and the tap 63 is thereafter applied to the lamps. When using a single bulb or lamp the capacitor wire can be wrapped around the lamp near the active terminal or attached to the active terminal such as the cathode of the lamp.

It is not necessary to actually use a fixed capacitor, such as the capacitor 120. It is possible to use other devices which as for example, an inductor such as a coil, a resistor, or the like, as indicated above. However, a capacitor has been found to be far more effective in that it does not create other problems which might arise with a resistor or an inductor. It is also possible to eliminate the entire conductor from the lower end of the coil 46 to the lamps $L_1$ and $L_2$. In this way, the lamps $L_1$ and $L_2$ could have one or both of their heater elements closely located to the coil 46 as in the autotransformer type winding. In this way, a stray capacitance is effective to carry the high frequency energy to the lamps for purposes of igniting the same. Thereafter, the stray capacitance itself effectively comes out of the circuit due to the drop in impedance in the lamps after ignition. It has been found that the minimum capacitance necessary for the coupling is only about 2.5 picofarads, although this could vary.

In accordance with the above outlined arrangement, when a plurality of the lamps are operated by the generator of the invention, they are effectively in parallel during ignition and during operation and where running voltages are applied, the lamps are effectively in series.

FIG. 9 illustrates input current and voltage wave forms. Particularly, FIG. 9 illustrates a sinusoidal voltage waveform designated as 70 with current pulses 72 in the input occuring coincident with the peaks in the amplitude of the voltage waveform.

In accordance with the present invention, it has been found desirable to have the current peaks coincident with the voltage peaks in order to achieve optimum operation. However, the voltage peaks and the current peaks could be displaced by as much as 50% or approximately 45°. In other words, if the voltage peaks occur on 90° cycles or 1.57 radians, the current peaks could be displaced or shifted as much as 45° with respect to the voltage peaks.

FIG. 10 illustrates a D.C. voltage waveform which exists in the circuit, and particularly in the conductor 30 prior to the joinder of the upper terminal of the coil 46 to the conductor 30. FIG. 11 illustrates a substantially similar D.C. voltage waveform in the conductor 30 prior to the joinder of the upper terminal of the coil 46 to the conductor 30, but of reversed polarity.

As indicated herein, it is believed that substantial energy savings are achieved by igniting the lamps through some type of capacitance means using the full voltage or substantially the full voltage developed across the collector coil 46 and thereafter reducing the voltage applied to the lamps by using the portion of the voltage developed between the upper terminal and the intermediate tap on the coil 46. It is also believed that substantial energy savings are achieved by the type of current and voltage waveforms which are generated by the circuit of the present invention. Specifically, the output electrical signal developed across the output terminals $P_1$ and $P_2$ of the generator have voltage pulses 122 and corresponding current pulses 124, the voltage pulses 122 have peaks and a certain decay rate to a zero level along with the current pulses having peaks and a certain decay rate to a zero level. The decay rate of the current pulses are much more gradual than the decay rate of the corresponding voltage pulses such that a substantial portion of the current pulses have a greater amplitude than the corresponding voltage pulses with respect to a zero level.

An example of the output voltage waveform is more fully illustrated in FIG. 12 and the output of the corresponding current pulses is more fully illustrated in FIG. 13 of the drawings. FIG. 14 illustrates the current pulses of FIG. 13 superimposed over the voltage pulses of FIG. 12 and showing the relationship therebetween. It can be observed that the current pulses and the voltage pulses both have a very fast rise time and a much more gradual fall time or so-called "decay rate" toward a zero level where the polarity will then change.

In essence, it can be observed that with the voltage pulses, there is a peak amplitude, designated by reference numeral 126 and a gradual fall time or "decay rate" for the substantial portion of the pulse width. Initially there is a relatively fast decay rate which becomes more gradual for the greater portion of the pulse width. In like manner, the current pulses in FIG. 13 also have peaks 128 corresponding with the peaks 126 of the voltage pulses, and similarly, a gradual decay rate for the remaining portion of the current pulse widths. Each of the current and voltage pulses has a leading edge 130 and a trailing edge 132.

By further reference to FIG. 12, it can be observed that the terminal portion or trailing edge of each of the voltage pulses is represented by a very sharp decay 134 to a zero level and then to a negative polarity. The current pulse also exhibits the same sharp decay at the point 136 where the current pulse also crosses the zero level to a negative polarity. However, it can be observed that the current pulses are driven by a substantially reduced voltage level for a substantial period of time.

FIG. 15 illustrates another output current waveform and associated output voltage waveform which is superimposed with respect to one another. In this case, the output voltage pulses are designated by reference numeral 140 and the corresponding voltage pulses are designated by reference numeral 142. Here again, it can be observed that the current and voltage pulses have the same relationship as the current and voltage pulses as illustrated in FIG. 14. However, the voltage pulses merely start the fall time from a higher amplitude than the corresponding current pulse, but achieve a much lower amplitude than the corresponding current pulses for the greater portion of the pulse width.

FIG. 16 illustrates another form of output current waveform which may be generated by the generator of the present invention. In this case, it can be observed that the output current waveform is comprised of positive current pulses 144 and negative current pulses 146. However, the amplitude of the negative polarity pulses is substantially less than the amplitude of the positive polarity pulses 144. Moreover, the negative polarity pulses 146 have a waveform somewhat similar to the waveform of the positive pulses 144 but with less amplitude in the rise time. In addition, the pulse width of the negative polarity pulses is less than the pulse width of the positive polarity pulses.

FIGS. 17 and 18 also represent other forms of output voltage pulses 148 and associated output current pulses 150, respectively, which may be generated in accordance with the present invention. FIG. 19 represents a view of the two waveforms of FIGS. 17 and 19 superimposed relative to one another. Again, it can be observed that the output voltage pulses 148 have positive polarity portions which are very similar to the output voltage pulses 122 in FIG. 12, and in like manner, the output current pulses 150 are similar to the output current pulses 124 in FIG. 13. However, the voltage pulses 148 and the corresponding current pulses 150 have very small amplitude negative polarity portions as illustrated.

FIGS. 20 and 21 represent still another output voltage waveform and associated output current waveform, respectively, which may be generated in accordance with the present invention. In this case, the output voltage waveform includes positive polarity pulses 152 and almost substantially identical negative polarity pulses 152'. Similarly, the output current waveform includes positive polarity pulses 154 and substantially similar negative polarity pulses 154'. In essence, the negative polarity pulses are almost mirror images of the positive polarity pulses in both the voltage and current waveforms and the negative polarity pulses have essentially the same wave length and same pulse amplitude as the positive polarity pulses.

FIGS. 22 and 23 illustrate still another form of output voltage waveform and output current waveform, respectively, which may be generated in accordance with the present invention. FIG. 24 is a composite view of the output voltage waveform of FIG. 22 and the output current waveform of FIG. 23 in superimposed relationship. In this case, the output voltage and output current waveforms represent a direct current signal having only positive polarity voltage pulses 156 and positive polarity current pulses 158 and no negative polarity pulses. It should be understood that all negative polarity pulses could be produced in both the current and voltage waveform. Further, in order to obtain this type of D.C. output, it would be necessary to remove the capacitor 62 in the circuit which effectively blocks the D.C. component.

The generation of this type of D.C. output current waveform and output voltage waveform is not preferred inasmuch as it may have some tendency to reduce the overall life of the lamps. Nevertheless, it is possible to generate this type of output electrical signal and still operate the lamps with substantial energy savings.

The transistor 42 used in the circuit of the present invention is preferably an NPN transistor as aforesaid and should have a minimum collector breakdown voltage of about 400 volts. The transistor 42 should have a maximum saturation voltage of about one volt and a collector-emitter sustaining voltage of about 400 volts.

In one preferred embodiment of the generator, the diodes 28 in the diode bridge 26 should each be rated at 2½ amps and 1,000 volts, although the capacitor 34 could range from about 10 microfarads to about 80 microfarads. The resistor 44 is a 330 K-ohm resistor, although it could range from about 20 K-ohms to about 500 K-ohms. The resistor 38 is a 150 ohm resistor although it could range from about 50 ohms to about 500 ohms. The capacitor 40 is a 0.022 microfarad capacitor although it could range from 0.01 microfarads to about two microfarads. The primary coil 46 will have about 400 turns and the feedback coil will have about 40 turns. The transistor 42 will have about 600 volts on the collector although it can have a minimum voltage of 400 volts. In the specific embodiment just mentioned, the transistor is a BU 207 transistor. It should be understood that this one embodiment is exemplary only.

The generator of the present invention has been used in conjunction with various types of gaseous discharge lamps and has been found to achieve substantial energy savings while producing the same light output as a conventional ballast. In many cases, the energy savings has been found to be 35% and even greater. Moreover, the generator is relatively cool after many hours of use, whereas a conventional ballast is too hot to be held in the human hand after a few hours of use.

Thus, there has been illustrated and described a unique and novel generator for use with loads having changing impedance characteristics such as ionic conduction lamps and which enables starting of such loads and thereafter operation of such loads with the same power source and with substantial energy savings. Thus, the generator of the invention fulfills all of the objects and advantages sought therefor. It should be understood that many changes, modifications, variations and other uses and applications will become apparent to those skilled in the art after considering this disclosure and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. A generator for starting and maintaining operation of a load which has a relatively high impedance during starting and a substantially lower impedance after starting and during operation, said generator comprising:

(a) power generating means for generating electrical power of a relatively high first voltage and relatively high impedance in a first mode and which is generally comparable to the impedance of said load during starting, and where the impedance of said load becomes substantially lower after starting, and said power generating means also capable of generating power of a second voltage and lower impedance in a second mode, and which second voltage is delivered from a portion of the power generating means which is different from that which delivers the first voltage, and (b) capacitance operable means operatively connected to said means for generating electrical power and being operatively connectable to said load to enable generation and delivery of electrical power having a high impedance during starting of said load, said capacitance operable means being responsive to changes in the impedance of said load and causing a switching to the second mode, said power generating means capable of providing electrical power of a lower impedance generally comparable to the lower impedance of said load during the operation of said load to be delivered to said load after starting and during operation of the load, said capacitance operable means being effectively electrically switched out of a circuit relationship with said power generating means which said power generating means is switched to the second mode.

2. The generator of claim 1 further characterized in that said load is an ionic conduction lamp which has a relatively high impedance during starting and a substantially lower impedance after starting and during operation.

3. The generator of claim 1 further characterized in that said capacitance operable means has a reactance which becomes substantially large relative to the impedance of said load after starting so that it is effectively electrically inoperative after starting.

4. The generator of claim 3 further characterized in that said capacitance operable means is operatively connected to the means to generate electrical power in such manner that it permits electrical power generated in the first mode to be of a relatively high voltage and is effectively electrically disconnected from the circuit after the load has started so that electrical power of the second voltage is delivered to the load from another portion of the means to generate electrical power.

5. The generator of claim 4 further characterized in that the load is a phosphor energizable lamp which has a relatively high impedance before starting and a substantially lower impedance after starting and during operation, and where said capacitance operable means is coupled to deliver high frequency energy to the lamp during starting in order to achieve ignition of said lamp.

6. A generator for starting and maintaining operation of an ionic conduction lamp which has a relatively high impedance during starting and a substantially lower impedance after starting and during operation, said generator comprising:
 (a) power generating means for generating high frequency electrical power in a first mode of a relatively high first voltage sufficient to ignite an ionic conduction lamp and impedance generally comparable to the impedance of said lamp during starting, and where the impedance of said lamp becomes substantially lower after starting, and said power generating means also capable of providing electrical power in a second mode of a second voltage and impedance sufficient to maintain energization of an ionic conduction lamp after ignition, and which second voltage is delivered from a portion of the power generating means which is different from that which delivers the first voltage, and
 (b) capacitance operable means operatively connected to said means for generating electrical power and being operatively connected to said lamp to enable generation and delivery of electrical power having a voltage sufficient to ignite the ionic conduction lamp, said capacitance operable means being responsive to the drop in impedance of the lamp after ignition and causing a switching to the second mode so that the power generating means is capable of providing to the lamp after ignition high frequency electrical power of a second voltage and a lower impedance generally comparable to the impedance of said lamp during the operation of said lamp, said capacitance operable means being effectively electrically switched out of a circuit relationship with said power generating means when said power generating means is switched to said second mode.

7. The generator of claim 6 further characterized in that said capacitance operable means has a reactance which becomes substantially large relative to the impedance of said lamp after starting so that it is effectively electrically inoperable after starting.

8. A generator for igniting an ionic conduction lamp and maintaining operation of the same, said generator comprising:
 (a) conductive means for receiving electrical power from a source thereof,
 (b) a solid state electronic element operatively connected to said conductive means,
 (c) an inductive member having a pair of end terminals, said inductive member also being connected to said solid state electronic element, such that a voltage is generated across said inductive member, said inductive member being operatively connectable to an ionic conduction lamp for igniting and operating same, said lamp being ignitable with a first voltage and a high impedance developed across a substantial portion of said inductive member and said lamp being operable with a lesser portion of the voltage across said inductive member after ignition and during operation of said lamp, and
 (d) means responsive to changes in the impedance of said lamp operatively connectable to said inductive member to enable the first voltage and high impedance generated over a substantial portion of the inductive member to be delivered to said lamp during ignition and which means is operable in response to the change of impedance in the lamp to switch the voltage applied to the lamp and thereby cause the second voltage and impedance developed across a portion of said inductive member which is smaller than the size between the end terminals to be delivered to said lamp after ignition of said lamp and during operation thereof.

9. The generator of claim 8 further characterized in that tap means is operatively connected to said inductive member intermediate end terminals of said inductive member and being operatively connectable to said lamp, said lamp being operable by the voltage across the inductive member from one end terminal thereof to said tap means after ignition of said lamp.

10. The generator of claim 9 further characterized in that said ionic conduction lamp has a relatively high impedance during ignition and a substantially lower impedance after ignition and during operation, the means responsive to the impedance of the lamp is a capacitance operable means which operatively couples said inductive member and said lamp and enables ignition of said lamp through said capacitance operable means and operation of said lamp after ignition with power delivered to said lamp not through said capacitance operable means.

11. The generator of claim 10 further characterized in that said capacitance operable means has a reactance which is substantially large relative to the impedance of said lamp after ignition so that it is effectively electrically inoperative after starting.

12. The generator of claim 8 further characterized in that said solid state electronic element is a transistor for developing the voltage across said inductive member.

13. The generator of claim 12 further characterized in that a resistive-capacitive feedback circuit is operatively connected across said transistor and said inductive member.

14. A generator for starting an ionic conduction lamp and maintaining operation of the same, said generator comprising:
(a) means for receiving electrical power from a source thereof,
(b) an inductive member operatively connected to said means for receiving electrical power and having a voltage generated thereacross, said inductive member having a first terminal and a second terminal for operative connection to an ionic conduction lamp,
(c) a tap operatively connected to said inductive member intermediate said terminals and being operatively connectable to said lamp, said lamp being energized during starting from the voltage developed across said inductive member and delivered from said first and second terminals and said lamp being energized during operation and after starting from a portion of the voltage developed across the inductive member from one terminal to the tap, and
(c) means responsive to a change in an impedance of the lamp operatively connected to said inductive member to enable voltage generated between the first and second terminals of the inductive member to be delivered from said inductive member during starting and which means is operable in response to the lowering in impedance in the lamp to cause a substantially lesser portion of the voltage developed across the portion of said inductive member between one of said terminals and said tap to be delivered from said inductive member after starting of said lamp and during operation thereof, said means responsive to the impedance of the lamp being effectively disconnected from the circuit in response to the lamp changing to the lower impedance so that the voltage developed between said one terminal and said tap can be delivered to the lamp.

15. The generator of claim 14 further characterized in that said lamp has a relatively high impedance during starting and a substantially lower impedance after starting and during operation, and the generator applies a high frequency voltage having an impedance generally comparable to the impedance of the lamp during starting and a high frequency voltage with a lower impedance generally comparable to the impedance of the lamp after starting and during operation.

16. The generator of claim 14 further characterized in that said ionic conduction lamp has a relatively high impedance during starting and a substantially lower impedance after starting and during operation, the means responsive to the impedance of the lamp is a capacitance operable means which operatively couples said inductive member and said lamp and enables starting of said lamp through said capacitance operable means and operation of said lamp after starting with power delivered to the lamp through said tap and with said capacitance operable means effectively inoperable.

17. The generator of claim 16 further characterized in that said capacitance operable means has a reactance which is substantially large relative to the impedance of said lamp after starting so that it is effectively electrically inoperative after starting.

18. The generator of claim 14 further characterized in that said first and second terminals are end terminals and said inductive member is a coil.

19. The generator of claim 14 further characterized in that said tap is located at a distance from one of the terminals to provide to the lamp from about 15% to about 40% of the total developed voltage across said inductive member.

20. A method for starting an ionic conduction lamp having a relatively high starting impedance and a substantially lower operating impedance and thereafter maintaining operation of said lamp, said method comprising:
(a) generating a first high frequency voltage with an impedance generally comparable to the relatively high impedance of said lamp during starting and before operation of said lamp and which first voltage has been developed across a greater portion of an inductive member, and delivering said first voltage to said lamp through a capacitance operable means during starting, and which lamp immediately changes from said relatively high impedance to a substantially lower impedance after starting and during operation,
(b) sensing the reduction in the impedance of the lamp by the capacitance operable means and automatically, as a result of the sensing of the reduction, stopping the application of the first voltage to the lamp through the capacitance operable means by an effective discontinuation of the operation of said capacitance operable means, and
(c) simultaneously with the ceasing of the application of the first voltage to the lamp through the capacitance operable means and as a result of said sensing of the reduction, generating and applying to said lamp through a circuit path other than through said capacitance operable means, a second high frequency voltage with an impedance generally comparable to the lower impedance of the lamp during operation and after starting of said lamp and which second voltage has been developed across a lesser portion of said inductive members.

21. A generator for providing an electrical signal to and maintaining energization of an ionic conduction lamp, said generator comprising:
(a) means for receiving electrical power,
(b) means operatively connected to the means for receiving electrical power for generating an electrical signal comprised of a plurality of current pulses and a plurality of voltage pulses, said current pulses having a fast rise time and a relatively slow and gradual fall time and where the fall time of said current pulses constitutes a substantial portion of the pulse width of each of said current pulses, said current pulses being generated at a sequence and rate sufficient to maintain operation of said lamp, each of said voltage pulses having a fast rise time and a gradual fall time which is different than that of the current pulses for a substantial portion of the pulse width of the current and voltage pulses, and where the gradual fall time of each of the voltage pulses constitutes a substantial portion of the time for the width of each of the voltage pulses, the amplitude of the voltage pulses dropping off rapidly after the initial first rise and then more gradually, such that the fall time rate of the current pulses is more gradual than the fall time rate of the voltage pulses so that a lamp can be provided by current pulses driven by a substantially reduced voltage level for a substantial period of time, and
(c) means for coupling the means for generating to an ionic conduction lamp so that the lamp can be powered by current pulses of low amplitude for a substantial portion of the time of operation.

22. A lighting system comprising:
(a) a plurality of ionic conduction lamps,
(b) means for generating electrical power for energizing the lamps, the means for generating having a first output terminal, a second output terminal, and a third output terminal, the output impedance of the means for generating between the first and second output terminals being substantially greater than that between the second and third output terminals, and
(c) capacitance operable means connecting the lamps in parallel between the first and second output terminals before and during ignition of the lamps to impress across each lamp at least a greater portion of the voltage generated by said means for generating, said capacitance operable means being operable in response to the change of impedance in the lamps to effectively connect the lamps in series between the second and third output terminals after ignition of the lamps to reduce the source impedance driving the lamps and apply to the lamps a lesser portion of the voltage generated by the means for generating.

23. The lighting system of claim 22 further characterized in that the means for generating comprises an inductive winding, the first and third output terminals are the end terminals on the winding and the second output terminal is an intermediate tap on the winding.

24. The lighting system of claim 23 further characterized in that each lamp has a first and second electrode and the system comprises connecting means for connecting the first electrode of one lamp to the first output terminal, a large capacitor connecting the second output terminal to the first electrode of the other lamp, means for connecting the second electrodes of the lamps to each other, and a small capacitor connecting the third output terminal to the second electrodes of the lamps, the impedance of the small capacitor being much larger than the impedance of the other capacitor.

25. A generator for use with an ionic conduction lamp, said generator comprising:
(a) input terminal means to receive electrical current,
(b) a transistor operatively connected to input terminal means to receive the electrical current,
(c) a transformer coil connected to at least one terminal of said transistor,
(d) a feedback loop containing a feedback coil connected across a second and third terminals of said transistor,
(e) a resistive-capacitive circuit portion in said feedback loop such that a current is generated in said transformed coil,
(f) a first and second terminals associated with said transformer coil for coupling to an ionic conduction lamp,
(g) tap means intermediate the first and second terminals of each coil and being operatively connected to said coil for also coupling to an ionic conduction lamp, and
(h) a capacitance operable means coupled between said generator and the lamp such that power is applied to the lamp from said first and second terminals of said coil during ignition of said lamp and from one of said first or second terminals, and said tap means during operation and after ignition of said lamp, said capacitance operable means being effectively electrically uncoupled during operation of said lamp after ignition.

26. The generator of claim 25 further characterized in that rectifying circuit means is operatively connected to said input terminal means to receive said electrical current and rectifying said electrical current.

27. The generator of claim 25 further characterized in that said transformer coil is primary coil which is connected to the collector of said transistor, said resistive-capacitive circuit portion is connected to the base of said transistor and said feedback coil is connected to the emitter of said transistor.

28. The generator of claim 25 further characterized in that the first and second terminals on said transformer coil are end terminals capable of being connected to conductive electrodes on said lamp.

29. The generator of claim 25 further characterized in that said transformer and feedback coils form part of a core transformer.

30. The generator of claim 26 further characterized in that a resistor is connected between said rectifying circuit means and said third terminal of said transistor to at least affect voltage drop across said transistor.

31. The generator of claim 29 further characterized in that said core transformer comprises a central sleeve with said transformer coil and feedback coil wound on said central sleeve, a pair of magnetically conductive housing sections disposed over said sleeve and coils, said housing sections being spaced apart from each other by a gap.

32. The generator of claim 31 further characterized in that said housing sections substantially enclose said coils and sleeve.

33. The generator of claim 29 further characterized in that said core transformer comprises an electrically nonconductive sleeve with said coils wound upon said sleeve, and an magnetically conductive metallic core disposed within said sleeve.

34. An ionic conduction lamp system comprising:
(a) an ionic conduction lamp having a relatively high impedance during starting and a substantially lower impedance after starting and during operation, and being comprised of:
 (1) an enclosed bulb,
 (2) an electrically energizable element associated with said bulb, and
 (3) at least a pair of electrodes associated with said bulb, at least one of said electrodes being connected to said electrically energizable element,
(b) a generator operatively connected to said lamp and being comprised of:
 (1) power generating means for generating a first high frequency electrical power in a first mode of a first voltage sufficient to ignite said ionic conduction lamp and impedance generally comparable to the impedance of said lamp during starting, and where the impedance of said lamp becomes substantially lower after starting, said power generating means also being capable of providing power in a second mode of a second voltage and impedance sufficient to maintain energization of an ionic conduction lamp after ignition, and
 (2) capacitance oerable means operatively connected to said means for generating electrical power and said lamp to enable generation and delivery of electrical power having a voltage sufficient to ignite said ionic conduction lamp, said capacitance operable means being responsive to the drop in impedance of the lamp after ignition and causing a switching to the second mode so that the generating means is capable of providing to the lamp after ignition high frequency electrical power of a second voltage and a lower impedance generally comparable to the impedance of said lamp during the operation of said lamp, said capacitance operable means being effectively electrically switched out of a circuit relationship with said power generating means when said power generating means is switched to said second mode.

35. The generator of claim 34 further characterized in that said capacitance operable means is operatively connected to the means to generate electrical power in such manner that it permits electrical power of a relatively high voltage to be generated by the power generating means during starting and is effectively electrically disconnected from the circuit after the lamp has started so that electrical power of a lower voltage is delivered to the lamp from another portion of the power generating means.

36. The generator of claim 35 further characterized in that said capacitance operable means is coupled to deliver high frequency energy of about 20 kilohertz to about 40 kilohertz during starting and during operation.

37. An ionic conduction lamp system comprising:
(a) an ionic conduction lamp having a relatively high impedance during starting and being comprised of:
  (1) an enclosed bulb,
  (2) an electrically energizable element associated with said bulb, and
  (3) at least a pair of electrodes associated with said bulb, at least one of said electrodes being connected to said electrically energizable element.
(b) a generator operatively connected to said lamp and being comprised of:
  (1) conductive means for receiving electrical power from a source thereof,
  (2) a solid-state electronic element operatively connected to said conductive means,
  (3) an inductive member operatively connected to said solid state electronic element, such that a voltage is generated across said inductive member, said inductive member being operatively connected to said ionic conduction lamp for igniting and operating same, said lamp being ignitable with a first voltage and high impedance developed across a substantial portion of said inductive member and said lamp being operable with a second voltage and a lower impedance developed across a lesser portion of said inductive member after ignition and during operation of said lamp, and
  (4) means responsive to the changes in impedance of said lamp operatively connected to said inductive member to enable the first voltage and high impedance generated over a substantial portion of the inductive member to be delivered to said lamp during ignition and which means is operable in response to the reduction in impedance in the lamp to switch the voltage applied to the lamp and thereby cause the second voltage and relatively low impedance developed across a lesser portion of said inductive member to be delivered to said lamp after ignition of said lamp and during operation thereof.

38. The system of claim 37 further characterized in that tap means is operatively connected to said inductive member intermediate end terminals of said inductive member and being operatively connected to said lamp, said lamp being operable by the voltage across the inductive member from one end terminal thereof to said tap means after ignition of said lamp.

39. The system of claim 38 further characterized in that said ionic conduction lamp has a high impedance during ignition and a substantially lower impedance after ignition and during operation, the means responsive to the impedance of the lamp is a capacitance operable means which operatively couples said inductive member and said lamp and enables ignition of said lamp through said capacitance operable means and operation of said lamp after starting with power delivered to said lamp not through said capacitance operable means.

40. The generator of claim 39 further characterized in that said capacitance operable means has a reactance which is substantially large relative to the impedance of said lamp after ignition so that it is effectively electrically inoperative after starting.

41. The system of claim 37 further characterized in that said solid state electronic element is a transistor for developing the voltage across said inductive member.

42. The generator of claim 41 further characterized in that a resistive-capacitive feedback circuit is operatively connected across said transistor and said inductive member.

43. An ionic conduction lamp system comprising:
(a) an ionic conduction lamp comprising:
  (1) an enclosed bulb,
  (2) an electrically energizable element associated with said bulb, and
  (3) at least a pair of electrodes associated with said bulb, at least one of said electrodes being connected to said electrically energizable element,
(b) a generator operatively connected to said bulb and being comprised of:
  (1) means for receiving electrical power from a source thereof,
  (2) an inductive member operatively connected to said means for receiving electrical power and having a voltage generated thereacross, said inductive member having a first terminal and a second terminal operatively connected to said ionic conduction lamp,
  (3) a tap operatively connected to said inductive member intermediate said terminals and being operatively connectable to said lamp, said lamp being energized during starting from the voltage developed across said inductive member and delivered from said first and second terminals, and said lamp being energized during operation and after starting from a portion of the voltage developed across the inductive member from one terminal to the tap, and
  (4) means responsive to changes in the impedance of the lamp operatively connected to said inductive member to enable voltage generated between the first and second terminals of the inductive member to be delivered from said inductive member during starting, and which means is operable in response to the reduction in impedance in the lamp to cause a substantially lesser portion of the voltage developed across the portion of said inductive member between one of said terminals and said tap to be delivered from said inductive member after starting of said lamp and during operation thereof, said means responsive to the impedance of the lamp being effectively disconnected from the circuit in response to the lamp changing to the lower impedance so that the voltage developed between said one terminal and said tap can be delivered to the lamp.

44. The generator of claim 43 further characterized in that said lamp has a relatively high impedance during starting and a substantially lower impedance after starting and during operation, and the generator applies a high frequency voltage having an impedance generally comparable to the impedance of the lamp during starting and a high frequency voltage with a lower impedance generally comparable to the impedance of the lamp after starting and during operation.

45. The generator of claim 43 further characterized in that said ionic conduction lamp has a relatively high impedance during starting and a substantially lower impedance after starting and during operation, the means responsive to the impedance of the lamp is a capacitance operable means which operatively couples said inductive member and said lamp and enables starting of said lamp through said capacitance operable means and operation of said lamp after starting with power delivered to the lamp through said tap and with said capacitance operable means effectively inoperable.

46. The generator of claim 45 further characterized in that said capacitance operable means has a reactance which is substantially large relative to the impedance of said lamp after starting so that it is effectively electrically inoperative after starting.

47. The generator of claim 43 further characterized in that said first and second terminals are end terminals and said inductive member is a coil.

48. The generator of claim 43 further characterized in that said tap is located at a distance from one of the terminals to provide to said lamp from about 15% to about 40% of the total developed voltage of said inductive member.

49. A generator for operating an ionic conduction lamp, said generator comprising:
  (a) means for receiving electrical power,
  (b) means operating connected to the means receiving electrical power for generating an electrical signal with voltage pulses having peaks and a certain decay rate to a zero level and current pulses having peaks and a certain decay rate to a zero level, and where the decay rate of the current pulses is more gradual than the decay rate of the voltage pulses, and
  (c) means for coupling the means for generating to an ionic conduction lamp such that the lamp can be powered by current pulses driven by substantially reduced voltage level for a substantial period of time.

50. The generator of claim 49 further characterized in that said voltage pulses and current pulses have fast rise times and gradual decay rates.

51. The generator of claim 50 further characterized in that the voltage pulses and current pulses negative polarity portions.

52. The generator of claim 49 further characterized in that the means for generating comprises an inductor and a transistor connected to said inductor for generating a voltage across said inductor.

53. The generator of claim 52 further characterized in that pulse control timing means is operatively connected to said means for generating to enable current pulses to be generated in a sequence and at a frequency sufficient to maintain energization of an ionic conduction lamp.

54. The generator of claim 53 further characterized in that said pulse control timing means is a resistive-capacitive network.

55. The generator of claim 52 further characterized in that said inductor is a primary coil means and is connected to the collector of said transistor, a resistive-capacitive network is connected to the base of said transistor and an additional coil means is connected to the emitter of said transistor.

56. A generator for starting and maintaining operation of an ionic conduction lamp which has a relatively high impedance during starting and a substantially lower impedance after starting and during operation, said generator comprising:
  (a) means for generating high frequency electrical power of a voltage sufficient to ignite an ionic conduction lamp and impedance generally comparable to the impedance of said lamp during starting, and where the impedance of said lamp becomes substantially lower after starting,
  (b) capacitance operable means operatively connected to said means for generating electrical power and being operatively connected to said lamp to enable generation and delivery of electrical power having a voltage sufficient to ignite the ionic conduction lamp, said capacitance operable means being responsive to the drop in impedance of the lamp after ignition and causing the means for generating electrical power to deliver to the lamp after ignition high frequency electrical power of a lower voltage and a lower impedance generally comparable to the impedance of said lamp during the operation of said lamp, the electrical power of lower voltage and lower impedance being in the form of an electric signal with voltage pulses having peaks and a certain decay rate to a zero level and current pulses having peaks and a certain decay rate to a zero level, and where the decay rate of the current pulses is more gradual than the decay rate of the voltage pulses, and
  (c) means for coupling the means for generating to an ionic conduction lamp such that the lamp can be ignited and thereafter powered by current pulses driven by substantially reduced voltage level for a substantial period of time.

57. The generator of claim 56 further characterized in that said capacitance operable means has a reactance which becomes substantially large relative to the impedance of said lamp after starting so that it is effectively electrically inoperable after starting.

58. The generator of claim 56 further characterized in that said voltage pulses and current pulses each have very fast rise times and very gradual decay rates.

59. The generator of claim 56 further characterized in that the voltage pulses and current pulses negative polarity portions.

60. The generator of claims 57 further characterized in that pulse control timing means is operatively connected to said means for generating to enable current pulses to be generated in a sequence and at a frequency sufficient to maintain energization of an ionic conduction lamp.

61. A generator for igniting an ionic conduction lamp and maintaining operation of the same, said generator comprising:
  (a) conductive means for receiving electrical power from a source thereof, (b) a solid state electronic element operatively connected to said conductive means, (c) an inductive member operatively connected to said solid state electronic element, such that a voltage is generated across said inductive member, such inductive member being operatively connectable to an ionic conduction lamp said lamp being ignitable through a current driven by a substantial portion of the voltage across said inductive member and operable through a lesser portion of the voltage across said inductive member after ignition and during operation of said lamp, and (d) means responsive to changes in the impedance of said lamp operatively connected to said inductive member to enable current driven by a voltage generated over a substantial portion of the inductive member to be delivered to said lamp during ignition and which means is operable in response to the change of impedance in the lamp to cause a current driven by a lesser portion of the voltage across said inductive member to be delivered to said lamp after ignition of said lamp and during operation thereof, the current and voltage delivered to the lamp during operation of said lamp being present in the form of an electric signal with voltage pulses having peaks and a certain decay rate to a zero level and current pulses having peaks and a certain decay rate to a zero level, and where the decay rate of the current pulses is more gradual than the decay rate of the voltage pulses, and (e) means for coupling the last named means to an ionic conduction lamp such that the lamp can be powered by current pulses driven by substantially reduced voltage level for a substantial period of time.

62. The generator of claim 61 further characterized in that tap means is operatively connected to said inductive member intermediate end terminals of said inductive member and being operatively connectable to said lamp, said lamp being operable by the electrical signal with the voltage generated across the inductive member from one end terminal thereof to said tap means after ignition of said lamp.

63. The generator of claim 62 further characterized in that said ionic conduction lamp has a relatively high impedance during ignition and a substantially lower impedance after ignition and during operation, the means responsive to the impedance of the lamp is a capacitance operable means which operatively couples said inductive member and said lamp and enables ignition of said lamp through said capacitance operable means and operation of said lamp after ignition with the electric signal delivered to said lamp not through said capacitance operable means.

64. The generator of claim 61 further characterized in that said voltage pulses and current pulses have substantially coincident peaks.

65. The generator of claim 64 further characterized in that the voltage pulses have the same pulse width as the current pulses.

66. The generator of claim 65 further characterized in that pulse control timing means is operatively connected to said means for generation to enable current pulses to be generated in a sequence and at a frequency sufficient to maintain energization of an ionic conduction lamp.

67. A generator for starting and maintaining operation of a load which has a relatively high impedance during starting and a substantially lower impedance after starting and during operation, said generator comprising:

(a) power generating means for generating electrical power of a relatively high first voltage and relatively high impedance in a first mode and which is generally comparable to the impedance of said load during starting, and where the impedance of said load becomes substantially lower after starting, and said power generating means also capable of generating power of a second voltage, and which second voltage is delivered from a portion of the power generating means which is different from that which delivers the first voltage, and (b) capacitance operable means operatively connected to said means for generating electrical power and being operatively connectable to said load to enable generation and delivery of electrical power having a high impedance during starting of said load, said capacitance operable means being responsive to changes in the impedance of said load and causing a switching to the second mode, said power generating means capable of providing electrical power of a lower impedance generally comparable to the lower impedance of said load during the operation of said load to be delivered to said load after starting and during operation of the load, said capacitance operable means having a reactance which becomes substantially large relative to the impedance of the load after starting so that it is effectively electrically switched out of a circuit relationship with said power generating means when said power generating means is switched to the second mode.

68. The generator of claim 67 further characterized in that load is a phosphor eneragizable lamp which has a relatively high impedance before starting and a substantially lower impedance after starting and during operation, and where said capacitance operable means is coupled to deliver high frequency energy to the lamp during starting in order to achieve ignition of said lamp.

* * * * *